A. T. COLLIER.
MANUFACTURE OF FLEXIBLE MATERIAL FROM INDIA RUBBER AND THE LIKE.
APPLICATION FILED OCT. 8, 1910.
1,000,781. Patented Aug. 15, 1911.
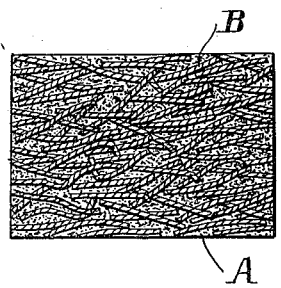
Witnesses:
Inventor
Arthur T. Collier
by James L. Norris, Jr.
Atty

UNITED STATES PATENT OFFICE.

ARTHUR THOMAS COLLIER, OF ST. ALBANS, ENGLAND.

MANUFACTURE OF FLEXIBLE MATERIAL FROM INDIA-RUBBER AND THE LIKE.

1,000,781. Specification of Letters Patent. Patented Aug. 15, 1911.

Application filed October 8, 1910. Serial No. 586,017.

*To all whom it may concern:*

Be it known that I, ARTHUR THOMAS COLLIER, a subject of the King of Great Britain, residing at St. Albans, Hertfordshire, England, have invented a new and useful Improvement in the Manufacture of Flexible Material from India-Rubber and the Like, of which the following is a specification.
This invention relates to an improved manufacture of flexible, light, strong and waterproof material from india-rubber and the like, said material being useful in the manufacture of pneumatic and other vehicle tires, of belting for conveyers or for the transmission of power, of boot and shoe soles, the wheels of roller-skates, pneumatic balls such as tennis and other playing balls, enemas or motor-horn bulbs, hose pipes and like articles where flexibility and strength are required without stretching.

It has heretofore been suggested to mix cotton, flax, ramie or other fiber in the natural or untwisted condition or fibers such as those obtained from rags, cloth or cotton waste, with suitable dough rubber in the mixing mill, the whole being afterward vulcanized. The material so formed, when used under some conditions, has been found to be deficient in strength and also to be liable to rise in temperature when subjected to frequently repeated bending stresses such as occur for example in the driving-wheel tires of a motor-vehicle of high power.

Now according to the present invention, in lieu of fibers such as above indicated, I use for mixing with plastic composition suitable for vulcanization, fibers tightly twisted into individual threads, such for example as sewing cotton, cut into short lengths, for example, in the case of No. 40 cotton, half an inch long. The length of the threads may be increased in proportion to their thickness, but the threads must not be so long as to cause knotting or setting in lumps and so prevent intimate mixture. I find a suitable length for No. 12 sewing cotton or thread to be approximately one inch. If used in longer lengths there is a tendency for the threads to become intertwined during the mixing process, and thus prevent a uniform distribution. The threads, either previously treated or not with a thin solution of india-rubber, are intimately mixed with dough rubber in a mixing mill. This dough or plastic composition suitable for vulcanization preferably consists of Para rubber mixed with a suitable amount of sulfur to produce a flexible vulcanized rubber when cured. It may however consist of sulfur and other india-rubber, rubber substitutes or mixings of various rubbers or of rubbers and rubber substitutes.

The mixture of threads and dough so obtained may be rolled out into sheets and the sheets used to form the desired articles in the usual manner, joints where necessary being preferably beveled to prevent the whole mass of threads being cut at right angles.

In the accompanying drawing I have shown a piece of sheet india rubber A having a number of tightly twisted threads B incorporated therewith.

During the rolling of the material into sheets the threads tend to arrange themselves with their lengths in the direction of rolling so that the sheet has less elasticity and greater tensile strength in this direction than in the transverse direction. I prefer to cut belting from the sheet in such a direction as to utilize this maximum strength. But for other purposes, such as vehicle tires, I may combine several layers so arranged that the directions of rolling of the different layers lie at right angles to one another. When the articles have been brought to the desired shape or configuration, they are cured or vulcanized in any suitable known manner.

By using individual threads as above described, I am enabled greatly to increase the strength of the material and also to use a larger proportion of cotton to india-rubber or the like than heretofore. I find that for heavy motor tires a good proportion is 20% of cotton threads to 80% of rubber, though this amount of cotton may be increased to 30%, a good deal depending on the nature of the rubber mixing, when such is employed. For belting, and general sheeting to take the place of what is known as the "insertion" sheeting, in the rubber trade, about the same proportion is suitable, as also for boot soles, and such like goods. For valve-washers, and goods where a short thick shape is required with flexibility, a less proportion of cotton viz. 5% to 10% is preferable, while for hard goods approaching the uses of vulcanite, as much as 70% of cotton can be employed.

Since the surface of thread exposed to the rubber is smaller than in the case where fibers are used in a loose or untwisted condition, the elastic properties of the rubber are retained and the liability of the material to crack when under bending stresses is reduced. Moreover, by reason of the fibers being tightly twisted the resultant tensile strength is increased. Further, as the flexible material has a greater tensile strength, it can be used of a less thickness for any given purpose and thus the stress to which the layers on the outside of a bend are subjected is reduced and the tendency to breakage is also reduced. Furthermore, the material keeps cooler when subjected to continuously varying bending stresses such as are produced when it is made up in the form of vehicle tires or driving belts. In cases where the material is used in the manufacture of pneumatic tires, it may be combined with a layer or layers of canvas arranged for example on the inner surface of the tire or tire cover.

One great advantage of this material over insertion is that the material can be molded to any required shape without interfering with the tensile strength of the material. This is owing to the nature of it, in allowing the threads to accommodate themselves to the bending stresses during the process of vulcanization, the threads which are most in tension, that is, on the outside of the bend, relieve the tension during vulcanization by drawing through the rubber, while in canvas insertion goods this is not possible, and the inner canvases become puckered while the outer ones are unduly stressed.

The term "short lengths of thread", occurring in the appended claims is indicative of threads whose lengths vary between approximately one-half inch and one inch according to the character of the fibers of which the threads are formed, and the term "individual", as applied to such threads, is intended to indicate the fact that the threads are of unitary character; that is to say, the threads are separate, unconnected elements, as opposed to a woven fabric where the threads are not separate but have a positive connection with each other.

I claim:—

1. A process for the manufacture of a reinforced flexible material consisting in intimately mixing with a plastic composition suitable for vulcanization individual short lengths of thread composed of fibers tightly twisted together, bringing the mixture to the desired shape of the finished article, and then vulcanizing the same.

2. A process for the manufacture of a reinforced flexible material consisting in intimately mixing with an india-rubber dough suitable for vulcanization individual short lengths of thread composed of fibers tightly twisted together, bringing the mixture to the desired shape of the finished article, and then vulcanizing the same.

3. A composition of matter consisting of an intimate mixture of a plastic vulcanized material and individual short lengths of thread composed of fibers tightly twisted together.

4. A composition of matter consisting of an intimate mixture of vulcanized india-rubber and individual short lengths of thread composed of fibers tightly twisted together.

ARTHUR THOMAS COLLIER.

Witnesses:
H. D. JAMESON,
R. WESTACOTT.